(12) United States Patent
Honegger et al.

(10) Patent No.: US 9,539,684 B2
(45) Date of Patent: Jan. 10, 2017

(54) MICRO TURNING MACHINE

(71) Applicant: MICROLUTION INC., Chicago, IL (US)

(72) Inventors: Andrew Honegger, Chicago, IL (US); Michael Howard, Chicago, IL (US); Elizabeth Amundsen, Chicago, IL (US); Brendon DiVincenzo, Chicago, IL (US); Grzegorz Nowobilski, Chicago, IL (US); Andrew Phillip, Forest Park, IL (US)

(73) Assignee: MICROLUTION INC., Chicago, IL (US)

( * ) Notice: Subject to any disclaimer, the term of this patent is extended or adjusted under 35 U.S.C. 154(b) by 121 days.

(21) Appl. No.: 14/206,190

(22) Filed: Mar. 12, 2014

(65) Prior Publication Data

US 2014/0260841 A1    Sep. 18, 2014

Related U.S. Application Data

(60) Provisional application No. 61/787,488, filed on Mar. 15, 2013.

(51) Int. Cl.
*B23B 3/02* (2006.01)
*B23Q 1/62* (2006.01)
(Continued)

(52) U.S. Cl.
CPC . *B23Q 5/36* (2013.01); *B23B 3/02* (2013.01); *B23B 3/065* (2013.01); *B23Q 1/015* (2013.01);
(Continued)

(58) Field of Classification Search
CPC ............ Y10T 82/2583; Y10T 82/2524; Y10T 409/304536; Y10T 409/306664; B23Q 1/58; B23Q 1/585; B23Q 1/62; B23Q 1/621; B23Q 1/623; B23Q 1/626; B23Q 1/017; B23B 3/02

See application file for complete search history.

(56) References Cited

U.S. PATENT DOCUMENTS 3,117,492 A * 1/1964 Muller ..................... B23Q 1/70
                                                    29/26 R
3,200,470 A * 8/1965 Muller ..................... B23Q 1/03
                                                    29/26 R
(Continued)

FOREIGN PATENT DOCUMENTS

DE    10019669 A1 * 10/2015 ............. B23Q 1/017
EP     0816012 A1 *  1/1998 ............. B23Q 1/015
(Continued)

OTHER PUBLICATIONS

International Search Report and Written Opinion for Int. App. No. PCT/US2014/024272, mailed Jun. 23, 2014.

*Primary Examiner* — Sunil K Singh
*Assistant Examiner* — Ryan Rufo
(74) *Attorney, Agent, or Firm* — McDonnell Boehnen Hulbert & Berghoff LLP

(57) ABSTRACT

A machine tool having a monolithic base is disclosed. The monolithic base includes at least two flat surfaces that are mutually orthogonal and that are convex with respect to each other. The machine tool includes at least two moveable stages, each mounted to one of the flat surfaces, and each stage also being mutually orthogonal.

15 Claims, 5 Drawing Sheets

(51) Int. Cl.
  *B23Q 1/58*  (2006.01)
  *B23Q 5/36*  (2006.01)
  *H02K 7/14*  (2006.01)
  *G05B 19/18*  (2006.01)
  *B23Q 1/01*  (2006.01)
  *B23B 3/06*  (2006.01)

(52) U.S. Cl.
  CPC ............... *B23Q 1/017* (2013.01); *G05B 19/18* (2013.01); *H02K 7/14* (2013.01); *B23Q 1/585* (2013.01); *B23Q 1/62* (2013.01); *B23Q 1/621* (2013.01); *B23Q 1/626* (2013.01); *Y10T 82/2583* (2015.01); *Y10T 409/304536* (2015.01); *Y10T 409/306664* (2015.01)

(56) References Cited

U.S. PATENT DOCUMENTS

| | | | | |
|---|---|---|---|---|
| 4,196,501 A | * | 4/1980 | Shimajiri | B23B 31/263 29/26 A |
| 4,484,387 A | * | 11/1984 | Nachmany | B23Q 1/01 409/137 |
| 4,510,668 A | * | 4/1985 | Ishida | B23Q 1/01 29/561 |
| 4,612,832 A | * | 9/1986 | Ushigoe | B23B 3/167 29/36 |
| 4,856,178 A | * | 8/1989 | Salvagnini | B23B 23/02 29/27 A |
| 6,120,355 A | * | 9/2000 | Stadtfeld | B23F 19/025 451/218 |
| 6,669,415 B2 | * | 12/2003 | Stadtfeld | B23F 9/025 409/26 |
| 7,794,186 B2 | * | 9/2010 | Peiffer | B23F 9/10 409/40 |
| 2002/0033084 A1 | * | 3/2002 | Nakaminami | B23B 3/167 82/120 |
| 2002/0066342 A1 | * | 6/2002 | Baumann | B23Q 39/026 82/117 |
| 2002/0134207 A1 | * | 9/2002 | Miyano | B23Q 1/015 82/1.11 |
| 2006/0260448 A1 | * | 11/2006 | Fiedler | B23Q 1/015 82/1.11 |
| 2009/0053004 A1 | * | 2/2009 | Yamaura | B23Q 1/623 409/165 |
| 2010/0282037 A1 | * | 11/2010 | Fujimoto | B23B 3/30 82/121 |
| 2013/0208286 A1 | | 8/2013 | Kurahashi | |

FOREIGN PATENT DOCUMENTS

| | | | | |
|---|---|---|---|---|
| EP | 2345492 A2 | * | 7/2011 | ............... B21H 3/04 |
| GB | 2156712 | | 10/1985 | |
| JP | S51-30687 A | | 3/1976 | |
| JP | 61-050757 A | * | 3/1986 | ............ B23Q 16/02 |
| JP | 2003-326427 A | | 11/2003 | |
| JP | 2005-219167 A | | 8/2005 | |
| JP | 2011-041985 A | | 3/2011 | |
| JP | 2012-93262 A | | 10/2013 | |
| WO | WO 2004/080650 A1 | * | 9/2004 | ............... B23Q 1/52 |
| WO | WO 2006/122440 A1 | * | 11/2006 | ............... B23C 1/06 |
| WO | 2012/111170 | | 8/2012 | |
| WO | 2013/178625 | | 12/2013 | |

\* cited by examiner

MICRO TURNING MACHINE

CROSS REFERENCE TO RELATED APPLICATIONS

The present application is a non-provisional application of U.S. Ser. No. 61/787,488 filed on Mar. 15, 2013, the contents of which are fully incorporated by reference herein.

FIELD OF THE INVENTION

The present application relates generally to machine tools, and more particularly to a machine tool configured to perform small-scale, high accuracy machining or lathe operations.

BACKGROUND

Machine tools are used to manufacture parts by a mechanical cutting process using cutting tools. Machine tools may be manually operated, mechanically automated, or digitally automated via computer numerical control (CNC). One type of machine tool is a micro turning machine. Micro turning machines can perform a number of small-scale, high accuracy machining, or lathe operations. The machine tool may include one or more movable stages mounted onto a base. The base may have a main flat surface or may have two main flat surfaces in the shape of an "L." Generally, the stages are mounted either onto the single main surface or onto the inside or concave orthogonal surfaces of the "L."

SUMMARY

The present application discloses a machine tool having a monolithic base having at least two flat surfaces that are mutually orthogonal and that are convex with respect to each other, a first stage mounted to one flat surface of the monolithic base, and a second stage mounted to another of the flat surfaces of the monolithic base, the second stage being orthogonal to the first stage.

In another embodiment a machine tool is disclosed having a monolithic base having at least a first outer surface and a second outer surface, the first outer surface being orthogonal to the second outer surface, a first stage mounted to the first outer surface of the monolithic base, the first stage being configured to move along a Z-axis, and a second stage mounted to the second outer surface of the monolithic base, the second stage being orthogonal to the first stage, and the second stage bring configured to move along an X-axis.

BRIEF DESCRIPTION OF THE FIGURES

Exemplary embodiments of the invention are described herein with reference to the drawings, in which.

DETAILED DESCRIPTION

Described herein are embodiments of a machine tool. Generally, the machine tool is configured to perform small-scale, high accuracy machining operations, such as creating small screws, small orthopedic implants, minimally invasive surgical devices, small automotive parts such as fuel-injector nozzle-holes or other small parts. The machine tool includes a monolithic base with at least two flat surfaces that are positioned orthogonal to each other, and that are members of a convex portion of the base (i.e. they form the outside surface of an "L" as opposed to the inside surface of an "L"). For the purposes of this application this type of surface pair will be referred to as a "convex orthogonal" pair. An example of such a base is a rectangular-prismatic base, which has multiple convex orthogonal surface pairs. However, bases of other shapes and materials are possible providing they include at least one convex orthogonal surface pair. The machine tool includes at least two moveable stages each mounted to one of the flat convex orthogonal surfaces, and each stage also being mutually orthogonal. In one embodiment, for example, the base has a Z-stage mounted on one of the base's faces, and an X-stage and Y-stage are mounted on another of the base's faces. However, other configurations of stages are possible in other embodiments as well.

The method of building a machine tool with a base as described above provides several performance benefits. First, convex orthogonal surfaces are relatively simple to manufacture with high accuracy. Second, monolithic bases, as described, provide relatively high rigidity. Third, configuring the stages as described is of particular use in small-scale machining operations where the stage travels are relatively small and therefore the overhang of the stages past their respective mounting surfaces can be kept relatively small, increasing the accuracy, simplicity and rigidity of the stages.

Figure 1:
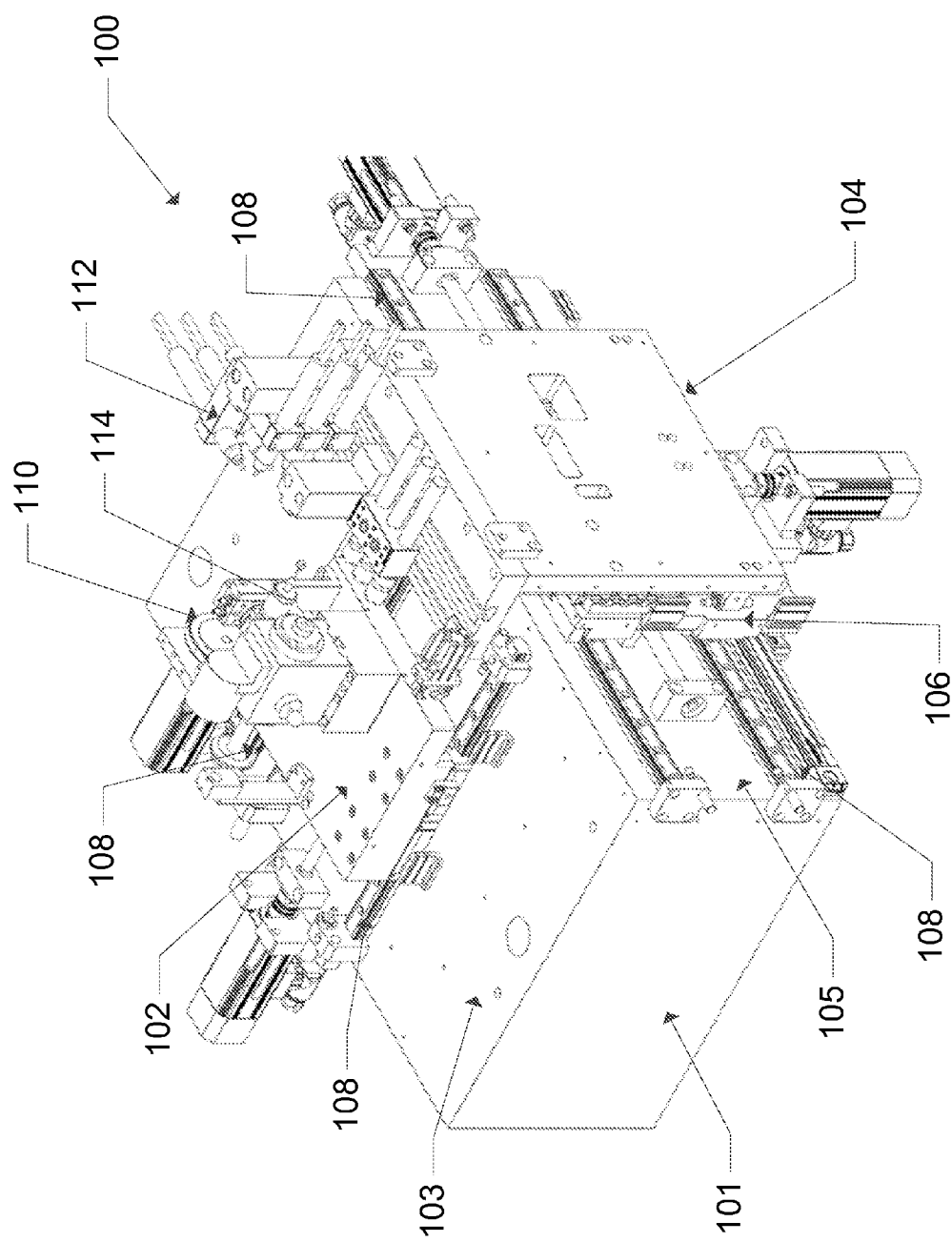
FIG. 1 is a perspective view of a machine tool according to an embodiment.

Turning now to the Figures, FIG. 1 depicts an example machine tool 100, in accordance with one embodiment. As depicted, the machine tool 100 includes a monolithic base 101, having a first stage 102, referred to as a Z-stage, disposed on a first outer flat surface 103, which is the top outer face of the base, a second stage 104, referred to as an X-stage, disposed on a second outer flat surface 105, which is an outer surface on a side of the base 101. As shown, both the Z-stage 102 and the X-stage 104 are mounted to an outer flat surface of a convex orthogonal pair of surfaces of the monolithic base 101, and are also mutually orthogonal to each other. In some embodiments, and as shown in FIG. 1, a third stage 106, referred to as a Y-stage, may be mounted to the X-stage 104. In one embodiment, the Y-stage may be disposed in a plane parallel to the plane of the X-stage.

As further depicted, the stages are mounted onto rails 108, which facilitate the movement along the respective axes. The Z-stage 102 is shown as having a main spindle 110 mounted thereon, whereas the X-stage 104 is shown as having tool holders 112 mounted thereon. The spindle 110 may be configured to hold and, at times, perhaps rotate a work piece about its axis. Alternately, the Z-stage 102 may have a main spindle affixed thereto that may be configured to hold and, at times, perhaps rotate a cutting tool about its axis. The Z-stage 102 may also be configured to move along one axis, referred to herein for reference purposes as the Z axis.

Further, in this embodiment, the X and Y-stages 104, 106 may have one or more tools affixed thereto in one way or another. Alternately, the X and Y-stages may have a work material affixed thereto in one way or another. Generally, the X and Y-stages 104, 106 are configured to move along either or both of two axes, referred to herein for reference purposes as the X-axis and Y-axis, respectively, and each of which is substantially perpendicular to each other and to the Z-axis mentioned above. The X-stage 104 and Y-stage 106 are configured to move along these axes so that the tools affixed thereto come into contact with and perhaps manipulate the work piece. Other configurations of stages mounted to a single, monolithic base are possible as well.

Figure 2:
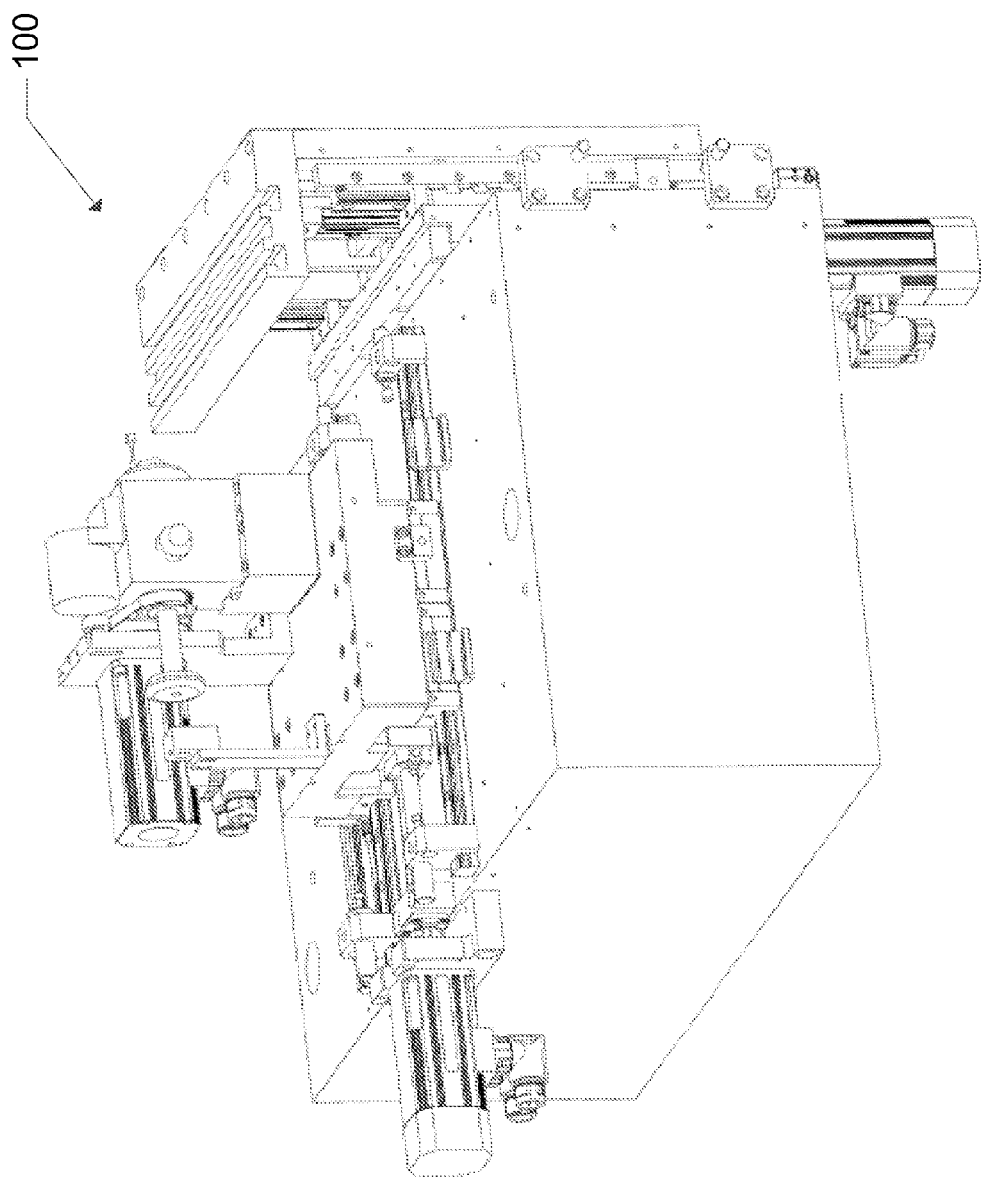
FIG. 2 is an alternate view of the machine tool shown in FIG. 1.

In addition, the machine tool 100 may include tool sensor 114 and/or a vision camera 116 (shown in FIG. 3) to allow for viewing of the machine by an operator, and to facilitate movement of the stages and measurement of the associated tools in order to carry out a lathe operation. FIG. 2 depicts an alternative view of the machine tool 100.

In other embodiments, the base 101 may have any number of stages mounted thereon, as long as there are at least two stages that are orthogonal to each other, and that are mounted on a convex orthogonal pair of flat faces of the base. In some embodiments, the X-stage and Y-stage are configured to move along respective axes at the same or different times. In some embodiments, a rotary stage(s) may be mounted to the X-stage or Y-stage and be generally configured to rotate about their respective axis(es). Other possibilities exist as well.

Generally, each stage may have one or more other components associated therewith to facilitate the movement and coordination of the several stages in order to carry out a machining operation. In some embodiments, each stage, including for example the Z-stage, the X-stage, and/or the Y-stage, is coupled to an actuator, for example a high-accuracy ball screw and motor or a linear motor, and a high-accuracy linear encoder or some other kind of encoder, and high accuracy linear motion guides. Each of these components may be coordinated by one or more computing devices (such as microcontrollers or special-purpose processors) configured to execute programming instructions that cause the components to manipulate the stages and spindle in such as way so as to carry out a desired lathe operation.

In one embodiment, a Tee-slot tool table 112 is configured to be mounted on one of the X-stage, Y-stage, and/or X-Y-stage. The tool table may include two Tee-slots for tool loading and is able to use any readily-available or custom-made tool holder. The Tee-slot tool table may have three stationary (non-rotating) turning/cutoff tools and six live (rotating) tools, and one gripper to pull the work material out of the main spindle. Notably, these are just example specifications, and in other embodiments, other specifications are possible as well. The tool table 112 is configured to be mounted on either or both of the X-stage and the Y-stage and can hold several live tools, drilling tools, cutoff tools, and any other type of tool used to perform a lathe operation. The machine tool may also be configured with a tool sensor that facilitates alignment of the tools held by the tool table. As a result of this and other configurations, the machine tool can fit more tools in a smaller space than other lathes.

In some embodiments, the machine tool includes other ancillary components such as a tool sensor 114 or 3D tool sensor. The tool sensor 114 may facilitate tool alignment so the machine tool may be able to utilize more tools in a relatively smaller area. Other advantages will be apparent to those skilled in the art as well.

In one embodiment, the tool sensor 114 is mounted on the Z-stage adjacent to the main spindle; however, in other embodiments, the tool sensor is mounted in other locations. Further, the machine tool may also include a vision camera 116 mounted adjacent to the main spindle, and/or a T-slot table 112 mounted on the X or Y-stage for holding one or more stationary or live tools or the work material. Still further, the machine tool may be mounted within a stand, which may include a flush coolant system and/or a user interface for interacting with one or more components of the machine tool.

Generally, one or more of the above-described configurations (and alternative configurations not described but still within the general scope of the disclosure) provide for an open and easy-access layout while still enabling the machine tool to carry out complex machining operations on a work piece. In addition, the monolithic base 101 provides for a compact, rigid, high-accuracy implementation of the linear positioning stages.

Motion platform technologies may also be used in conjunction with the machine tool 100. For example, in one embodiment, each stage includes or is coupled to one or more servomotor-driven high-precision ball screws or linear motors to facilitate motion of the stages along the respective axes. The bearings and rails shown represent precision linear guide rails, which may include recirculating ball carriages. The stages may also include a sliding headstock with a servomotor-driven spindle with indexing capability to facilitate live-tool machining Additionally, the main spindle may include any type of part holder, such a pneumatic collet closer.

Figure 3:
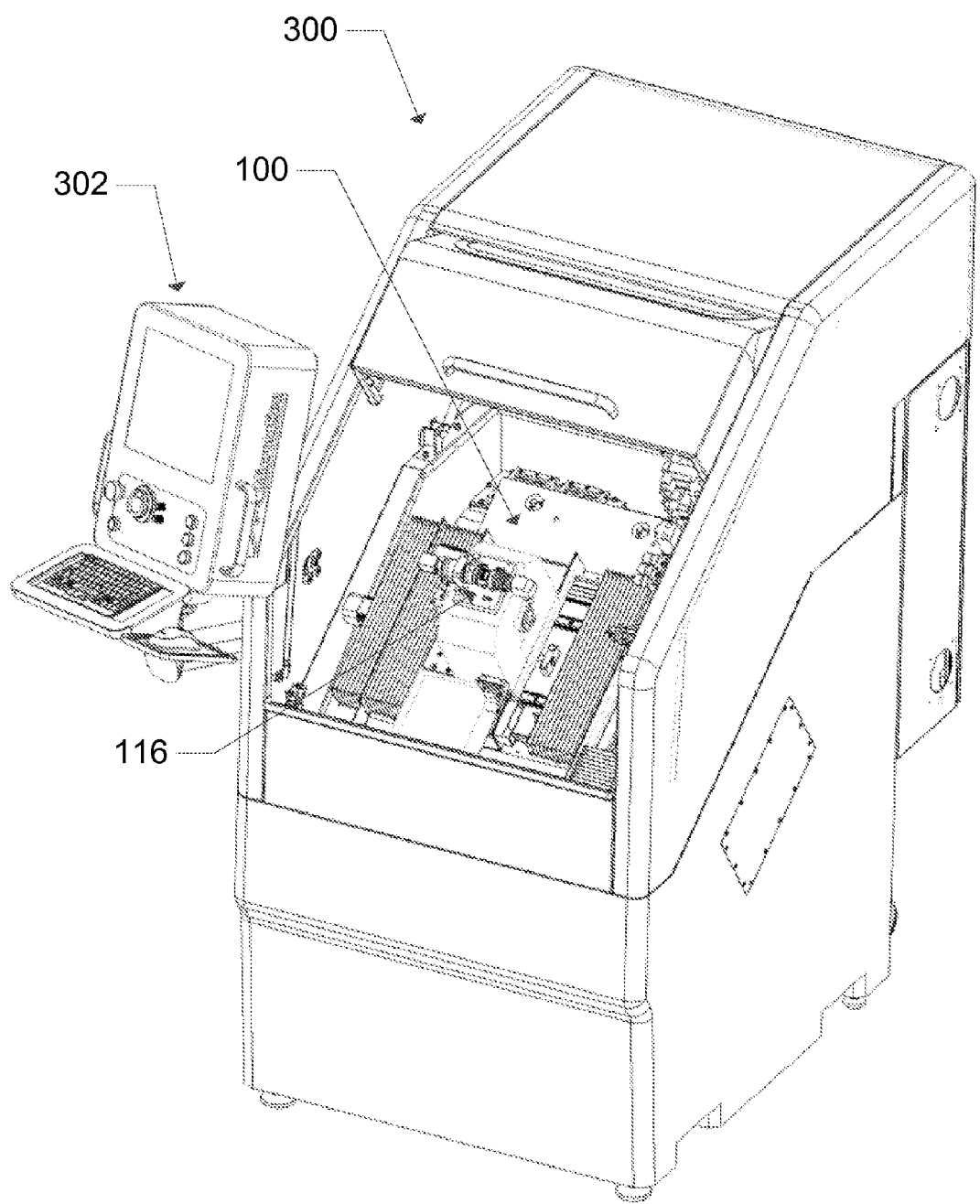
FIG. 3 depicts the machine tool of the present application within an enclosure.

FIG. 3 depicts an example machine tool enclosure 300, which is shown in the closed position and a corresponding user interface 302, in accordance with one embodiment. In one example, the machine tool enclosure 300 may be a molded enclosure. As depicted, the compact arrangement of the machine tool 100 allows it to reside in a machine enclosure, which may include a user interface 302 in some embodiments. As shown in FIG. 3, the machine tool 100 is mounted within the machine enclosure at an angle. The angle helps facilitate the cutting fluid and chips to move away from the cutting zone. The angle may be anywhere from about 20° to about 90°. The user interface 302 may be used to interact with the control software to select or otherwise provide for autonomous lathe operations. Other general features of the machine tool may include a 5000 RPM spindle, a 200 IPM feed rate, and three-axis stage travel, with 15" along the X-axis, 5" along the Y-axis, and 8" along the Z-axis. Additional example features of the machine tool include a 4-axis, Delta Tau controller, a precision-manufactured, granite base with X and Z rails mounted directly on the base's faces, a table orientation having an angled position allowing for coolant flow and chip removal, a camera system and separate user interface for input of manual tool settings, Heidenhain glass scales for each stage, pneumatic bar feed, and/or a part retrieval system. The angled position of the table orientation may be 35° relative to horizontal as shown in the figure, or some other angle. Notably, these are just example specifications, and in other embodiments, other specifications are possible as well.

Figure 4:
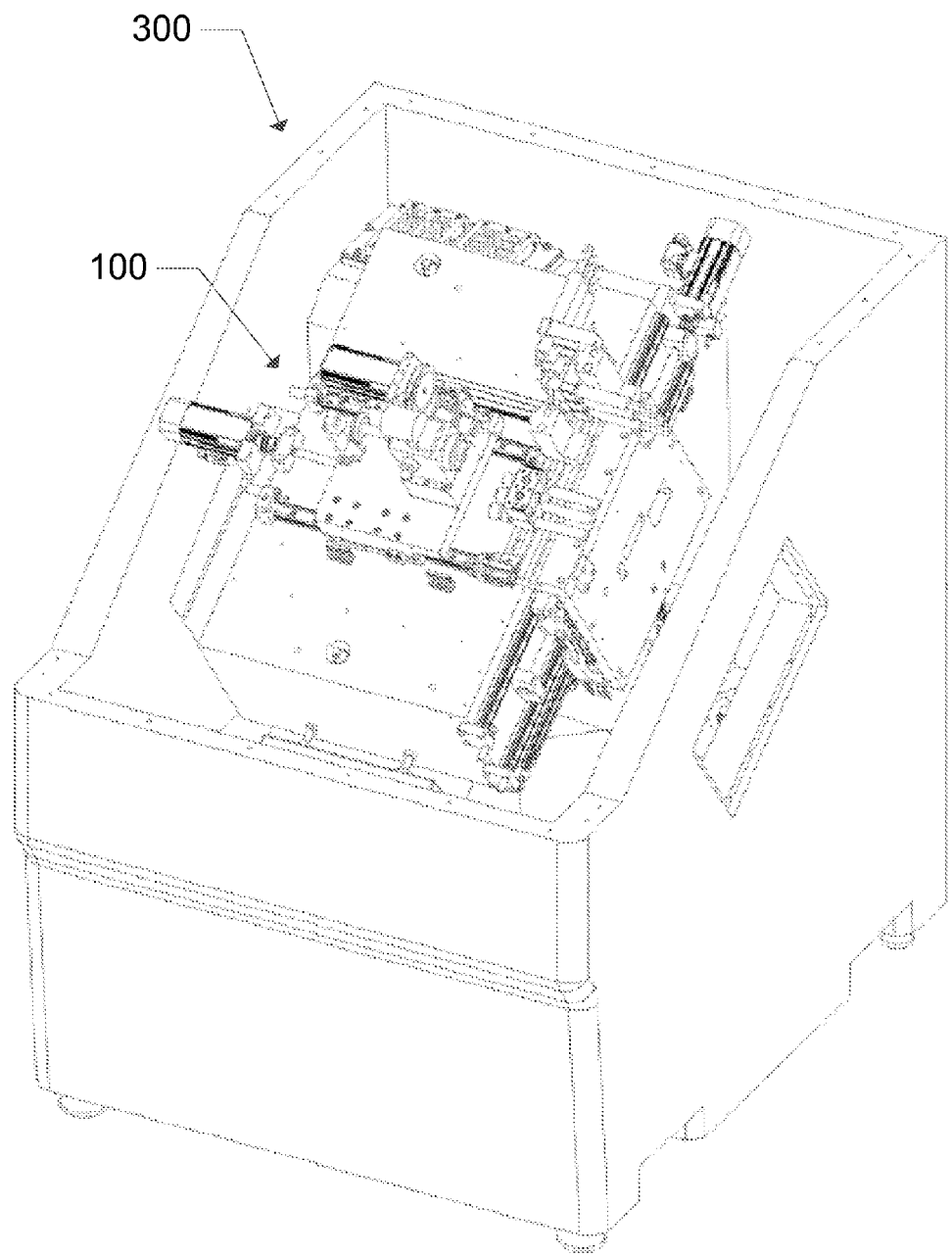
FIG. 4 is a close-up view of FIG. 3.

The user interface 302 may include a personal computer, tablet computer, or other computing device. Additionally, the user interface 302 may be configured to receive an input from a user, and control the various components of the machine tool enclosure 300. The machine tool enclosure 300 may include some or all of the components described with respect to FIG. 1-2 and/or FIGS. 4-5. The components within machine tool enclosure 300 may receive control signals based on the input provided at the user interface 302. The computing system and user interface 302 is further described with respect to FIG. 5. FIG. 4 shows a close-up view of the machine tool 100 mounted within the enclosure 300.

Figure 5:
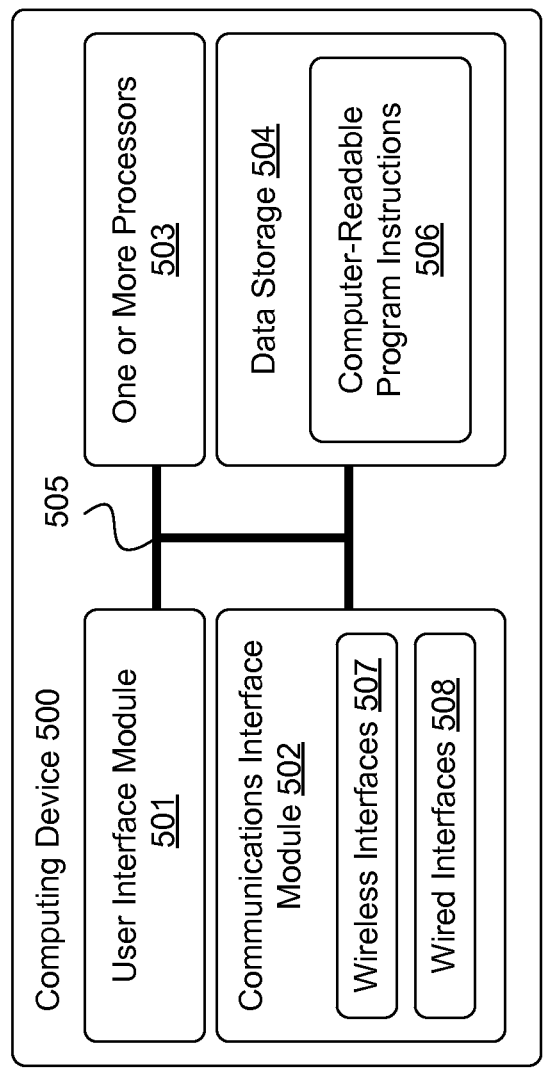
FIG. 5 is a block diagram of a computing device in accordance with an embodiment.

FIG. 5 is a block diagram of a computing device 500 in accordance with an example embodiment. For example, computing device 500 may include user interface 302 of FIG. 3. The computing device 500 can include a user interface module 501, a communication interface module 502, one or more processors 503, and data storage 504, all of which can be linked together via a system bus, network, or other connection mechanism 505.

The user interface module 501 can be operable to send data to and/or receive data from external user input/output devices. For example, the user interface module 501 can be configured to send/receive data to/from user input devices such as a keyboard, a keypad, a touch screen, a computer mouse, a track ball, a joystick, and/or other similar devices, now known or later developed. The user interface module 501 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 1001 can also be configured to generate audible output(s), such as a speaker, speaker jack, audio output port, audio output device, earphones, and/or other similar devices, now known or later developed. The user interface module 501 may be used to enter data for use with the methods and systems disclosed herein.

The network-communications interface module 502 can include one or more wireless interfaces 506 and/or wired interfaces 508 that are configurable to communicate via a network. The wireless interfaces 506 can include one or more wireless transceivers, such as a Bluetooth transceiver, a Wi-Fi transceiver, or other wireless transceiver. The wired interfaces 508 can include one or more wired transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wired network.

The one or more processors 503 can include one or more general purpose processors and/or one or more special purpose processors (e.g., digital signal processors, application specific integrated circuits, etc.). The one or more processors 503 can be configured to execute computer-readable program instructions 510 that are contained in the data storage 504 and/or other instructions as described herein.

The data storage 504 can include one or more computer-readable storage media that can be read or accessed by at least one of the processors 503. The one or more computer-readable storage media can include volatile and/or non-volatile storage components, such as optical, magnetic, organic or other memory or disc storage, which can be integrated in whole or in part with at least one of the one or more processors 503. In some embodiments, the data storage 504 can be implemented using a single physical device (e.g., one optical, magnetic, organic or other memory or disc storage unit), while in other embodiments, the data storage 504 can be implemented using two or more physical devices.

Computer-readable storage media associated with data storage 504 and/or other computer-readable media described herein can also include non-transitory computer-readable media such as computer-readable media that stores data for short periods of time like register memory, processor cache, and random access memory (RAM). Computer-readable storage media associated with data storage 804 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example. Computer-readable storage media associated with data storage 504 and/or other computer-readable media described herein can also be any other volatile or non-volatile storage systems. Computer-readable storage media associated with data storage 504 and/or other computer-readable media described herein can be considered computer readable storage media for example, or a tangible storage device.

The data storage 504 can include computer-readable program instructions 510 and perhaps additional data. In some embodiments, the data storage 504 can additionally include storage required to perform at least part of the herein-described techniques, methods, and/or at least part of the functionality of the herein-described devices and networks.

While the invention has been described herein with relation to certain embodiments and applications, those with skill in this art will recognize changes, modifications, alterations and the like which still come within the spirit of the inventive concept, and such are intended to be included within the scope of the application.

The invention claimed is:

1. A machine tool of a turning machine comprising:
   a monolithic base having a rectangular shape with a top flat surface, a bottom flat surface, and four flat side surfaces, the top flat surface being perpendicular to each of the flat side surfaces;
   a first stage mounted to the top flat surface of the monolithic base, wherein the first stage has a top surface, a bottom surface, and a plurality of side surfaces extending between the top and bottom surfaces, the top surface of the first stage being parallel to the top flat surface of the monolithic base;
   a second stage mounted to one of the side surfaces of the monolithic base, wherein the second stage has a top surface, a bottom surface, and a plurality of side surfaces extending between the top and bottom surfaces, the top surface of the second stage being parallel the side surface of the monolithic base to which the second stage is mounted, and the top surface of the second stage being orthogonal to the top surface of the first stage;
   a third stage mounted between the one side surface of the monolithic base and the second stage;
   wherein material shaping and cutting is performed during interaction between the first stage and the second stage; and
   a tool table mounted to the second stage, the tool table having a top surface, a bottom surface, and a plurality of side surfaces extending between the top and bottom surfaces, the top surface of the tool table being perpendicular to the top surface of the second stage and parallel to the top surface of the first stage.

2. The machine tool of claim 1, wherein the first stage is moveable along a first axis, and wherein the second stage is moveable along one or more other axes, each axis of which is substantially perpendicular to the first axis.

3. The machine tool of claim 2, further comprising:
   a processor configured to execute program instructions that cause (i) the first stage to move along the first axis, or (ii) the second stage to move along either or both of the one or more other axes.

4. The machine tool of claim 3, further comprising:
a spindle mounted on the first stage, the spindle being configured to hold and rotate a work piece; and
wherein the processor is further configured to cause either or both of the first stage and the second stage to move along their respective axes such that at least one tool of the tool table comes into contact with the work piece, thereby carrying out a lathe operation.

5. The machine tool of claim 2, wherein the third stage is configured to move along a second axis that is substantially perpendicular to the first axis, and the second stage is configured to move along a third axis that is substantially perpendicular to each of the first axis and the second axis.

6. The machine tool of claim 1, further comprising a spindle mounted on the first stage, the spindle being configured to hold and rotate a work piece or a cutting tool.

7. The machine tool of claim 1, further comprising a tool or a work piece mounted on the tool table.

8. The machine tool of claim 1, further comprising:
a machine enclosure having mounted therein the monolithic base.

9. The machine tool of claim 8 wherein the monolithic base is mounted in the molded machine enclosure at an angle.

10. The machine tool of claim 1, further comprising a tool sensor mounted on the first stage, the sensor being configured to measure the cutting tools within the same machine.

11. The machine tool of claim 1, further comprising a camera system mounted on the first stage, the camera being configured to view the work piece or cutting tool held within the spindle.

12. A machine tool comprising:
a monolithic base having a rectangular shape with a top flat surface, a bottom flat surface, and four flat side surfaces, the top flat surface being perpendicular to each of the flat side surfaces;
a first stage mounted to the top flat surface of the monolithic base, wherein the first stage has a top surface, a bottom surface, and a pluralit of side surfaces extending between the top and bottom surfaces, the top surface of the first stage being parallel to the top flat surface of the monolithic base, the first stage being configured to move along a Z-axis; and a second stage mounted to one of the side surfaces of the monolithic base, wherein the second stage has a top surface, a bottom surface, and a plurality of side surfaces extending between the top and bottom surfaces, the top surface of the second stage being parallel the side surface of the monolithic base to which the second stage is mounted, the top surface of the second stage being orthogonal to the top surface of the first stage, and the second stage being configured to move along an X-axis;

a third stage mounted between the one side surface of the monolithic base and the second stage;

wherein material shaping and cutting is performed during interaction between the first stage and the second stage; and a tool table mounted to the second stage, the tool table having a top surface, a bottom surface, and a plurality of side surfaces extending between the top and bottom surfaces, the top surface of the tool table being perpendicular to the top surface of the second stage and parallel to the top surface of the first stage.

13. The machine tool of claim 12 wherein the third stage is configured to move along a Y-axis.

14. The machine tool of claim 13 further comprising an enclosure, wherein the machine tool is mounted within the enclosure.

15. The machine tool of claim 14 further comprising a processor configured to execute program instructions that cause (i) the first stage to move along the Z-axis, (ii) the second stage to move along the X-axis, and (iii) the third stage to move along the Y-axis.

* * * * *